United States Patent
Ono et al.

(10) Patent No.: US 6,181,346 B1
(45) Date of Patent: Jan. 30, 2001

(54) GRAPHICS SYSTEM (75) Inventors: Makoto Ono, Yokohama; Yoshihisa Takatsu; Munetaka Ohtani, both of Yamato; Takao Moriyama, Yokohama, all of (JP)

(73) Assignee: International Business Machines Corporation, Armonk, NY (US)

( * ) Notice: Under 35 U.S.C. 154(b), the term of this patent shall be extended for 0 days.

(21) Appl. No.: 08/820,145

(22) Filed: Mar. 19, 1997

(30) Foreign Application Priority Data

Apr. 5, 1996 (JP) .................................................. 8-083561

(51) Int. Cl.⁷ ...................................................... G06T 11/40
(52) U.S. Cl. ........................... 345/430; 345/503; 345/506
(58) Field of Search .................................... 345/430, 503, 345/506

(56) References Cited

U.S. PATENT DOCUMENTS

| | | | |
|---|---|---|---|
| 5,485,559 * | 1/1996 | Sakaibara et al. | 345/433 |
| 5,821,944 * | 10/1998 | Watkins | 345/430 |
| 5,821,950 * | 10/1998 | Rentschler et al. | 345/505 |
| 5,886,706 * | 3/1999 | Alcorn et al. | 345/430 |
| 5,943,058 * | 8/1999 | Nagy | 345/430 |
| 5,949,428 * | 9/1999 | Toelle et al. | 345/431 |

* cited by examiner

*Primary Examiner*—Jeffery Brier
*Assistant Examiner*—Motilewa Good-Johnson
(74) *Attorney, Agent, or Firm*—Jay P. Sbrollini (57) ABSTRACT

This graphics system has a geometric sub-system that does not have to take into consideration memory resources for the raster sub-system of the graphics system. The graphics system sequentially receives from a host computer system data sets that define a graphic object and downloads texture data for graphics from the host computer system, so that geometric processing and rasterization are performed on the graphic object for display on a computer screen.

9 Claims, 7 Drawing Sheets

GRAPHICS SYSTEM

FIELD OF THE INVENTION

The present invention relates to a graphics system for displaying computer graphics (CG) on a display screen. More particularly, it relates to a graphics system that includes a geometric sub-system for dividing a graphic object into multiple polygons and for performing geometric processing only on the vertexes of the polygons. Furthermore, it relates to such a graphic system that also includes a raster sub-system for interpolating image data for pixels in the polygons. Specifically, the present invention pertains to a graphics system as described above in which the geometric sub-system performs parallel processing.

DESCRIPTION OF THE BACKGROUND

The generation and processing of graphic images using computers (so-called "computer graphics (CG)") is an example of the expansion in the use of computers. Recently, as the capabilities of computer displays have been improved, and their graphic functions enhanced, the focus has been placed on "3D Graphics", whereby a three-dimensional object is rendered on a two-dimensional medium for display on a screen. With the 3D graphics, an optical phenomenon of a 3D object when it is irradiated by a light source is provided by using a mathematical model, and based on the model, the surface of the object is described by using shading or perspective, or a pattern is used to represent the surface, for the display of a more realistic and colorful 3D image. The 3D graphic techniques have been used more frequently for CAD/CAM in science, in engineering, in manufacturing, and in other application fields, and for the development of various software applications.

Graphics System

The graphics system comprises a "geometric sub-system", generally as a front-end, and a "raster sub-system", generally as a back-end.

The geometric sub-system regards a graphic object as a set of polygons (normally, triangles), and performs schematic geometric processing for each polygon. The geometric processing performed by the geometric sub-system determines the position of an object on a computer screen. More specifically, geometric calculations, such as coordinate transformation, clipping, and light source calculation, are performed only on the coordinates of the individual vertexes defining the polygons. Coordinate transformation is a process for transforming the coordinates for the vertexes of a given polygon in accordance with the position of a visual point. Clipping is a process for removing portions of a polygon that lie outside the limits of a computer screen. Light source calculation is a process for calculating a luminance at each vertex based on its positional relationship with a light source.

The raster sub-system interpolates image parameters for all the pixels in a polygon by using image parameters acquired for the vertexes of the polygon. The image parameters are color data indicated by RGB, and a Z value representing the distance in the direction of the depth. In the latest highly colorful 3D graphic processing, fog "f" to represent distance and texture t to represent a material and a pattern on the surface of an object are included as image parameters, which are also calculated for each pixel. The polygon is represented in two dimensions and an object without a texture is merely an inorganic image obtained by shifting each plane in parallel or rotating it in accordance with a visual point. Therefore, the processing for putting texture on the surface of an object (texture mapping) is very important for the quality and the realism of an object. However, the amount of bit mapped texture data required for surface patterns is generally enormous, and a huge memory resource is thus required.

Parallel processing for graphics system

Since the capabilities of signal processing are limited when a large amount of calculations must be performed in real time, a multiprocessing technique that performs parallel processing using a plurality of node processors has been used. Since 3D graphic processing requires an enormous amount of calculations and data for image generation, parallel processing is used for enhancement of functions and performances.

In the above described graphics system, while the geometric sub-system performs calculations for each polygon, the raster sub-system performs calculations for each pixel in a polygon. In other words, the processing unit at the front-end and the back-end differ from each other. The sub-systems at the front-end and at the back-end frequently have separate inherent parallel structures to independently provide improved functions and performances. A system design in which the sub-systems adopt different parallel structures is described in, for example, Chapter 18 of "Computer Graphics" (J. D. Foley: second edition, Addison-Wesley).

Figure 6:
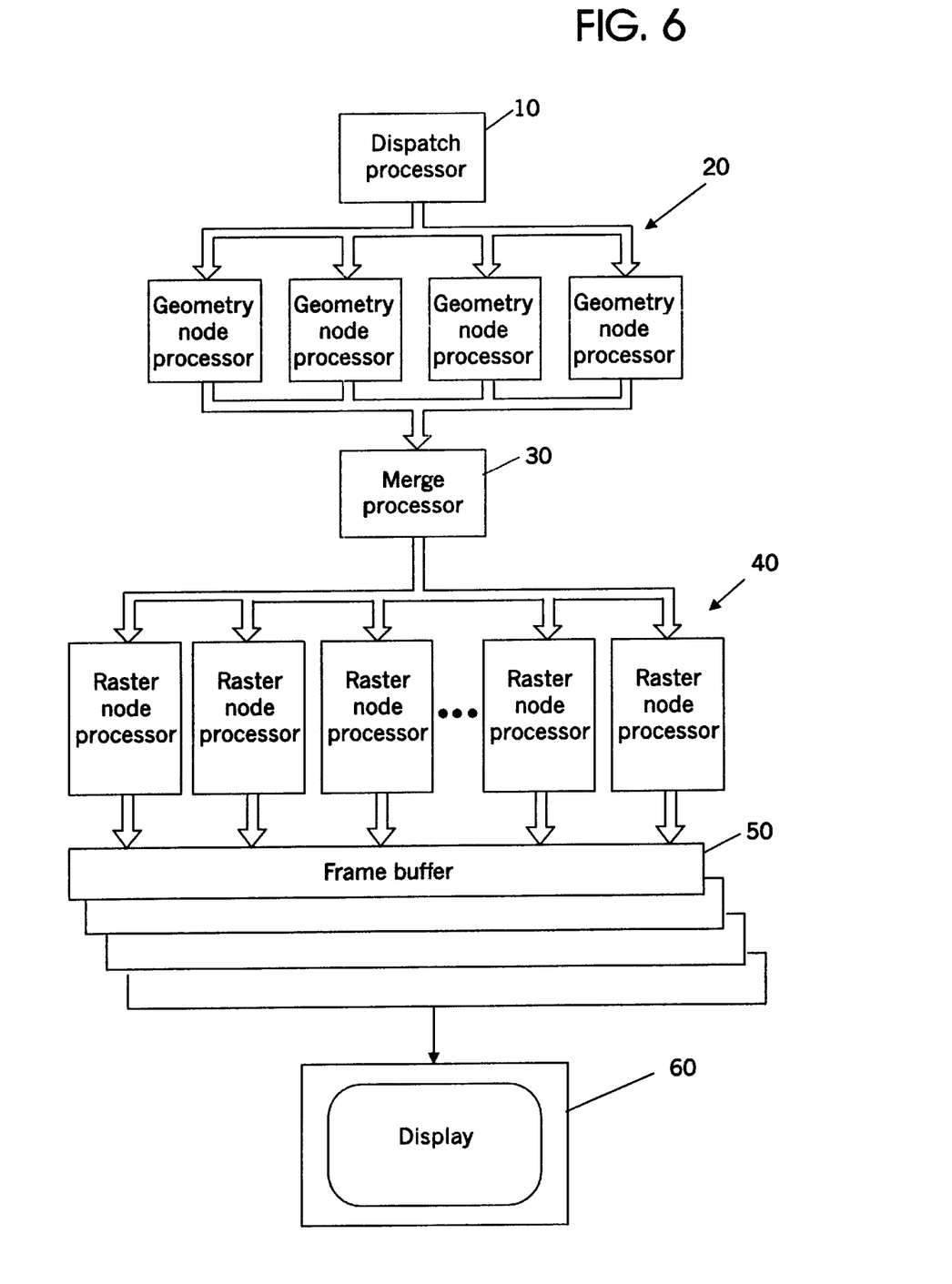
FIG. 6 is a schematic diagram illustrating the hardware arrangement of a graphics system that has two different parallel structures.

FIG. 6 is a schematic diagram illustrating a hardware arrangement for a graphics system that comprises two different parallel structures. The graphics system includes a dispatch processor 10; a plurality of geometry node processors 20; a merge processor 30; a plurality of raster node processors 40; and a frame buffer 50.

The dispatch processor 10 distributes drawing instructions sets for the geometric processing of a 3D object to each of the geometry node processors 20. More specifically, the dispatch processor 10 is connected to another host computer system (not shown) via a bus. On the bus, the dispatch processor 10 sequentially receives a set of drawing instructions (also called a "data set"), and distributes the data sets so as to equalize the work loads imposed on the respective node processors 20. In other words, an data set is the unit to be distributed to the node processors 20. A data set is generally a set of data for defining one polygon (or a part of a polygon) and includes coordinate values for the vertexes, and attribute information, such as line widths, line types and texture IDs for specifying texture.

The geometry node processors 20, which constitute the core of the geometric sub-system, perform parallel geometric calculations for a 3D object. Each of the geometric node processors 20 performs coordinate transformation, clipping, and light source calculation for a received data set, and outputs the results to the merge processor 30.

The merge processor 30 merges the data sets transmitted from the geometry node processors 20, and imposes on the succeeding raster sub-system the rasterization of the data sets. The raster sub-system shown in FIG. 6 has a parallel structure including a plurality of raster node processors 40. The merge processor 30 also serves as a dispatch processor for the raster sub-system. That is, when the merge processor 30 receives a data set that has been geometrically processed, it distributes, to the raster node processors 40, the pixels in the screen regions defined by the data sets.

The raster node processors 40, which constitute the core of the raster sub-system, rasterize the distributed pixels. Since data sets are distributed to the raster node processors 40 as pixel units, which are smaller than data set units, more raster node processors 40 are provided than the geometry node processors 20. The raster node processors 40 employ image parameters (color data, such as RGB and fog) that have been acquired for each vertex to interpolate the image parameters for distributed pixels and to put texture image (texture mapping).

The results obtained by the raster node processors 40 are appropriately written to corresponding addresses in the frame buffer 50. The drawing information is read from the frame buffer 50 and is displayed on an attached display 60.

Problems with parallel graphics system

In a parallel geometric sub-system, several problems have arisen at the front-end.

One of these problems is the maintenance of the drawing order for drawing data sets. The problem concerns serialization. The data sets for geometric processing for a 3D object are distributed to the geometry node processors 20 as polygon units. However, the geometry node processors 20 do not always terminate their processing in the order in which the data sets were distributed. Data sets are not so generated that the work loads imposed on the geometry node processors 20 are equalized, and the time required for the geometric processing of the individual data sets is generally not the same. When, for example, data sets are distributed in order as polygons #1, #2 and #3, the geometry node processors 20 do not always terminate their processing so as to maintain that set order. The order in which the data sets are output may be different, such as polygons #2, #1 and #3.

Figure 7:
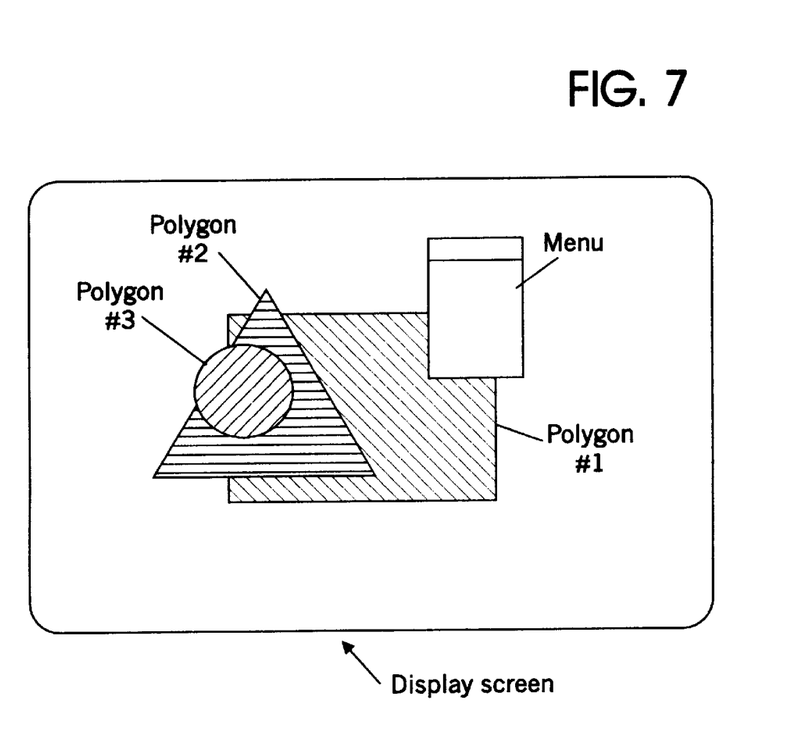
FIG. 7 is a diagram illustrating example computer graphics on a display screen.
Figure 8:
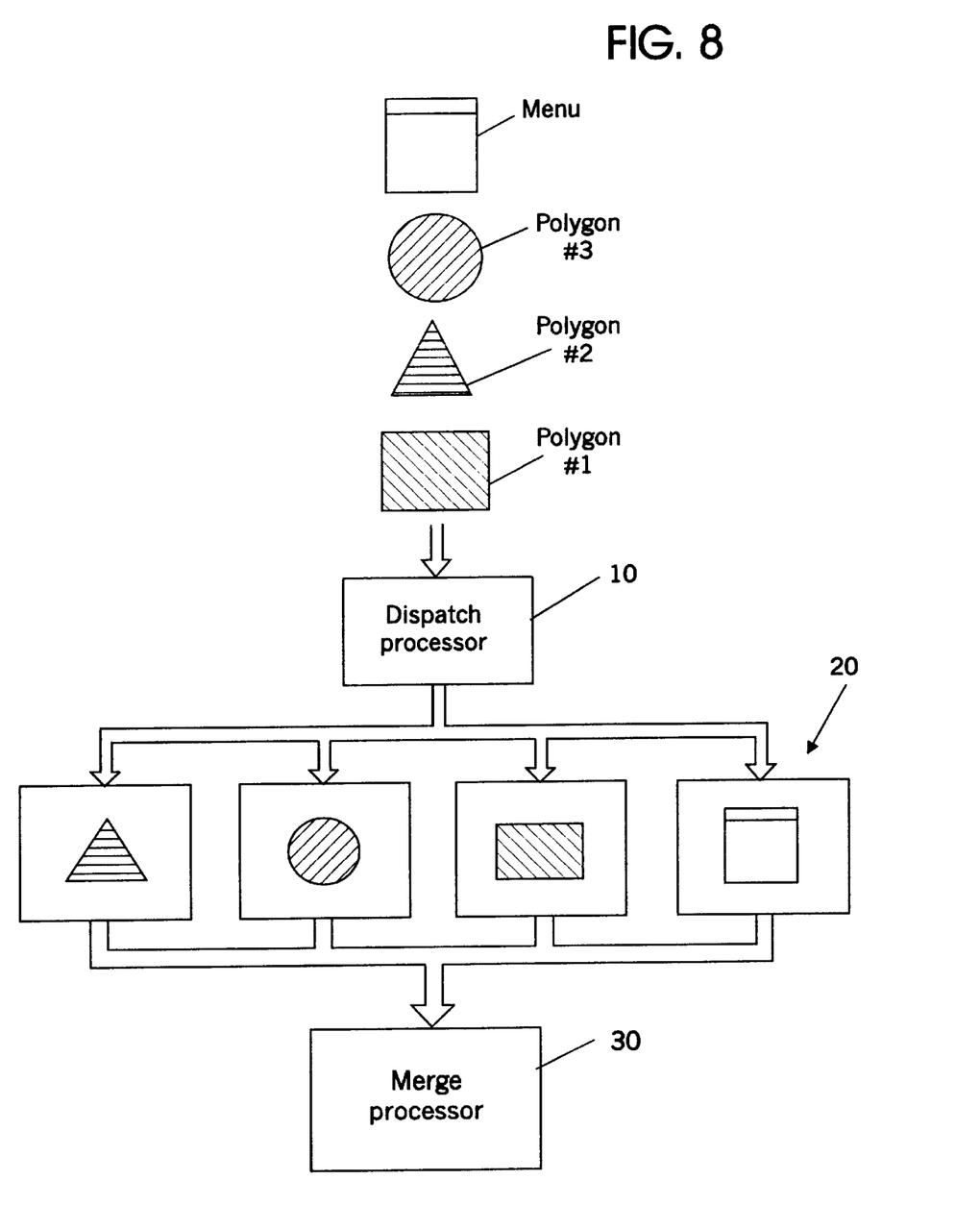
FIG. 8 is a schematic diagram illustrating the distribution for a graphics system for geometric processing.

So long as the data sets are related only to 3D graphics, no problems concerning serialization occur. Since the data sets for a 3D object include a Z value, hidden line removal is performed to prevent the view of a polygon in the front from being obscured by a polygon at the back. In other words, so long as only 3D graphics are used to construct a display screen, the drawing is arbitrarily performed, regardless of the drawing order. However, since a two-dimensional graphic, such as a menu window, does not include a Z value, the portion of the menu window that a later drawn polygon overlaps may be covered. Many conventional application programs distribute data sets for two-dimensional graphics last, so that the view of them will not be obscured. To generate a graphic shown in FIG. 7, for example, data sets are supplied in the order shown in FIG. 8. It is therefore necessary for the graphics system to maintain the data set order while transmitting the data sets to the raster sub-system, so as to maintain compatibility with conventional application programs.

The problem concerning the drawing order is resolved relatively easily in the system shown in FIG. 6, by adding to the merge processor 30 a function for serializing the data sets, for example. In accordance with the example in FIG. 8, even though the data set for the 2D menu was geometrically processed earlier than the data set for the polygon #3, the data set for polygon #3 is always transmitted to the raster sub-system first. Accordingly, even when the periods required for geometric processing of data sets are varied, and the data sets are transmitted to the merge processor 30 in a different order, the data sets are serialized by the merge processor 30 when transmitted to the raster sub-system. As a result, the desired display shown in FIG. 7 can be obtained.

Another problem with the parallel geometric sub-system involves the management of the memory resource for a raster sub-system. The raster sub-system also performs texture mapping in a screen region defined by a data set. In general, all of the texture data required for 3D graphics are held by a host computer system to which a graphics system is adapted. Generally, the raster sub-system includes a memory resource (not shown) that is adequate for the temporary storage of work data, and requested texture data are downloaded to the memory resource.

The size of the texture data is usually large. If the raster sub-system prepares a memory resource large enough to store texture data of all types, i.e., all the texture data stored in the host computer system, a huge memory capacity will be required and memory costs will be increased. And if unnecessary texture data are stored in the raster sub-system, it will not be used efficiently and the benefits provided by the memory resource will be wasted.

When only a part of the texture data is stored in the memory resource of the raster sub-system, a problem arises concerning which operating unit should manage the memory resource. The size of the texture data is large, as mentioned above, and downloading the texture data from the host computer system takes time. If the raster sub-system is in charge of managing the memory resource, for example, it is inevitable that its performance will be impaired. This is because when the raster node processors 40 are aware of the absence of desired texture data and they download the data, the time that elapses before rasterization is begun will be extended.

In addition, it is also difficult for the geometry node processors to manage the memory resource for the raster sub-system. Since the geometry node processors 20 do not know which data sets are being handled by other parallel processing geometry node processors, and since the serialization is performed after the geometric processing, rasterization of the data sets is not performed in the order in which the data sets were output by the geometry node processors 20.

In some systems (e.g., graphics system "GXT 1000" by IBM Corp.), when the memory resource is filled, the geometric sub-system serves as a single processor to facilitate the management of the memory resource. This system, however, adversely affects performance, and does not fully take the advantage of the parallel processing.

Therefore, it is one object of the present invention to provide an excellent graphics system for generating a computer graphics (CG) display screen.

It is another object of the present invention to provide an excellent graphics system that comprises a parallel processing geometric sub-system for dividing a graphic object into multiple polygons, and for performing geometric calculations only for the vertexes of the polygons; and a raster sub-system for interpolating image data for pixels in the polygons.

It is an additional object of the present invention to provide an excellent graphics system in which geometric sub-system does not have to take into consideration a memory resource of a raster sub-system.

It is a further object of the present invention to provide an excellent graphics system, which has a parallel processing geometric sub-system, that can efficiently manage a memory resource for a raster sub-system.

SUMMARY OF THE PRESENT INVENTION

To achieve the above objects of the present invention, a graphics system which sequentially receives, from a host computer system, data sets that define a graphic object, and which appropriately downloads texture data for graphics from the host computer system so that geometric processing and rasterization are performed on the graphic object for display on a computer screen, includes: a dispatch processor, for receiving data sets from the host computer system and for distributing data sets for geometric processing; a plurality of geometry node processors, each issuing a texture command including a texture identifier specified in distributed data sets and performing geometric processing of the distributed data sets; a merge processor, for merging geometrically processed data sets output by the geometry node processors and for distributing the data sets for rasterization; a texture memory, in which texture data are stored; a raster processor, for receiving the geometrically processed data sets from the merge processor and for rasterizing the geometrically processed data sets by referring to the contents in the texture memory; and texture memory management means, for managing texture data to be stored in the texture memory in accordance with the texture commands received from each of the geometry node processors.

The texture memory management means may have: a texture list of texture identifiers in the texture data, which are currently stored in the texture memory, and corresponding storage areas in the texture memory; first control means for determining whether or not the texture identifier indicated by a received texture command is included on the texture list and for issuing an interrupt request if the texture identifier isn't included on the texture list; and second control means for, in response to the interrupt request, downloading texture data corresponding to the texture identifier from the host computer system to the texture memory, and for updating a result obtained by the downloading to the texture list.

The texture list and the first control means may be provided in the merge processor, and the merge processor may include means for maintaining the order of data sets, i.e., for performing serialization. Further, the raster processor may consist of a plurality of raster node processors for rasterizing each pixel in screen regions defined by the data sets.

According to the graphics system of the present invention, when the geometry node processors have received data sets from the dispatch processor, they read a texture identifier described in the data set, and issue a texture command that includes the texture identifier. The texture memory management means has a texture list of texture data that are currently stored in the texture memory. Upon receipt of a texture command, the texture memory management means determines whether or not the texture identifier designated by the texture command is included on the texture list. If the result is negative, there are insufficient texture data in the texture memory to perform rasterization of data sets. The first control means then issues an interrupt request to instruct the downloading of texture data. In response to the interrupt request, the second control means downloads the designated texture data from the host computer system to the texture memory. If the texture memory is full, an algorithm, such as LRU (Least Recently Used) algorithm, may be employed to determine which data are unnecessary and should be abandoned, and then the necessary texture data are downloaded. The second control means updates the texture list in accordance with the result of the downloading.

While the texture memory management means is processing the texture command, the respective geometry node processors geometrically process the received data sets. The geometry node processors do not have to be concerned with the management of the texture memory, i.e., the memory resource for the raster sub-system.

At the time the raster sub-system begins rasterization of the data sets, the required texture data have already been downloaded to the texture memory. That is, the overhead for downloading the enormous amount of texture data is absorbed by the texture memory management means.

As a result, the graphics system of the present invention can operate the node processors of the geometric sub-system without taking into account the memory resource for the raster sub-system.

The graphics system of the present invention can efficiently manage the memory resource for the raster sub-system, with no deterioration of the parallel processing performance.

BRIEF DESCRIPTION OF THE DRAWINGS

The above and other objects, features, and advantages of the present invention will become apparent in due course during the detailed description of the embodiment of the present invention, which will be given while referring to the accompanying drawings of which.

DESCRIPTION OF THE PREFERRED EMBODIMENT

A. System Configuration

Figure 1:
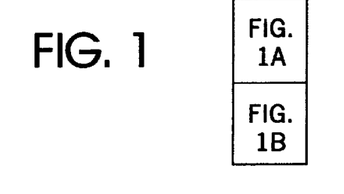
FIG. 1 is a specific diagram illustrating the hardware arrangement of a graphics system 100 according to the present invention.
Figure 1A:
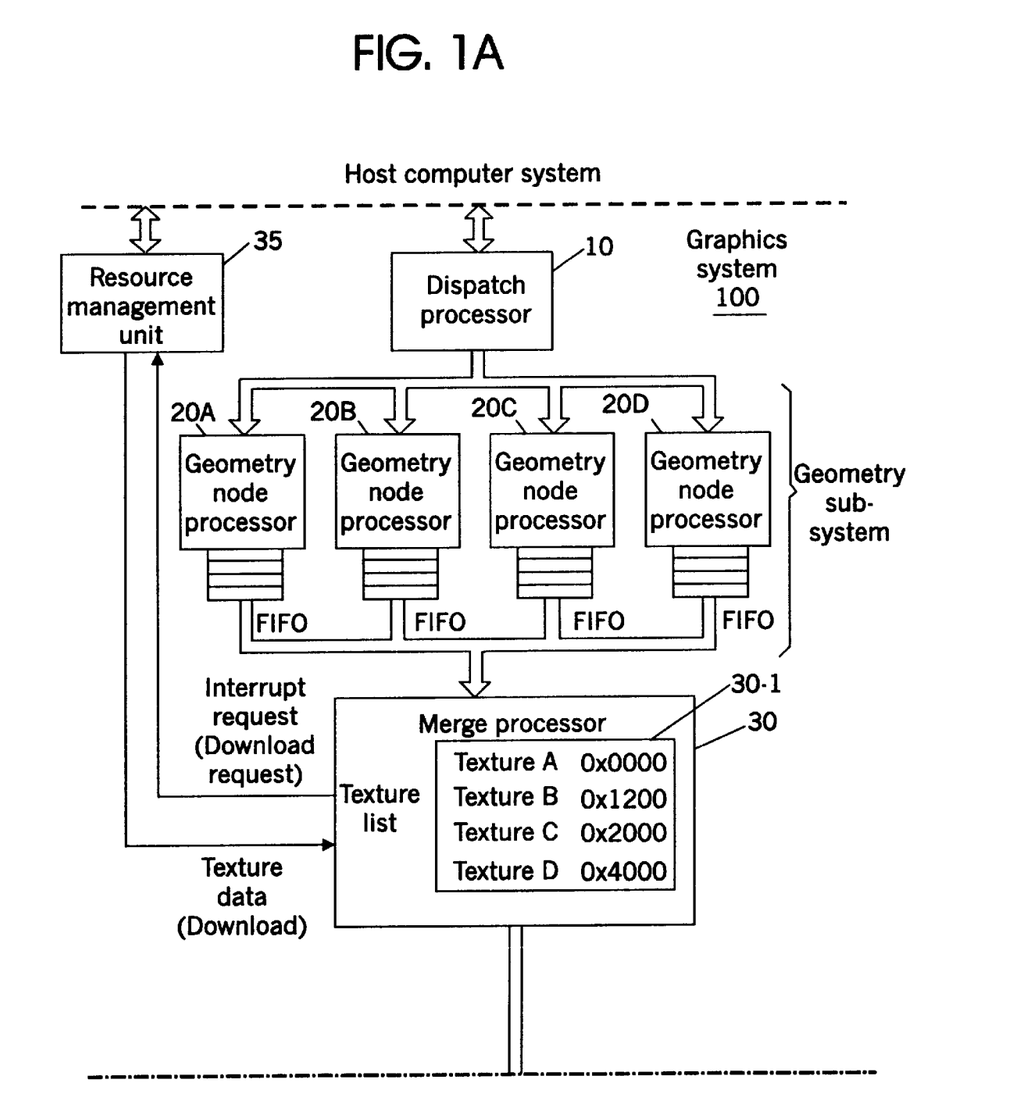
Figure 1B:
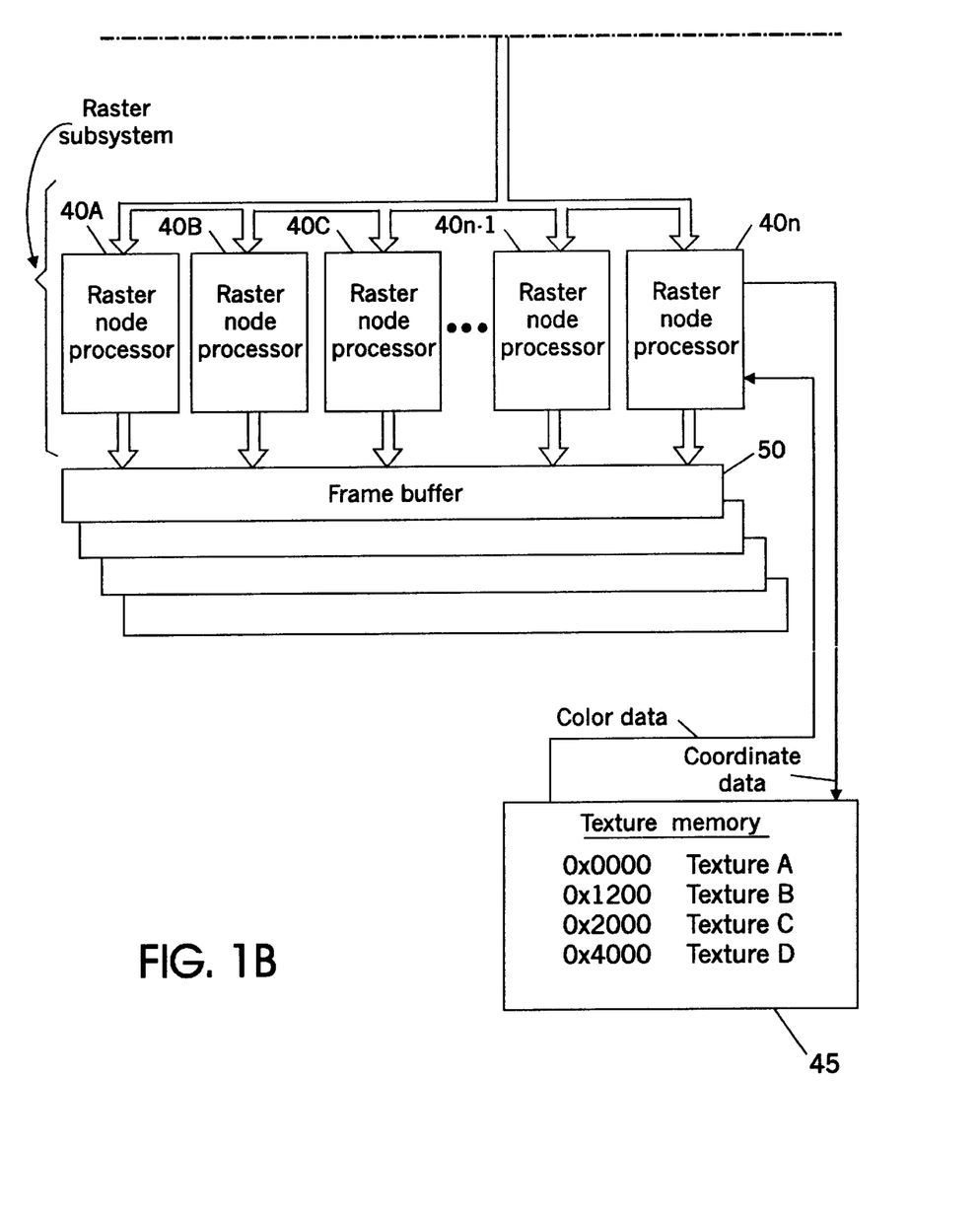

FIG. 1 is a specific diagram illustrating the hardware arrangement of a graphics system 100 according to the present invention. The system 100 comprises: a dispatch processor 10; a plurality of geometry node processors 20; a merge processor 30; a resource management unit 35; a plurality of raster node processors 40; a texture memory 45, as a memory resource of a raster sub-system; and frame buffers 50.

The graphics system 100 is used, for example, as an expansion adaptor card for another host computer system (not shown). One example of the host computer system is the workstation "RS/6000" by IBM Japan, Ltd. Such a host computer system divides a 3D graphic object into multiple polygons (normally, triangles), and prepares in advance three-dimensional coordinates for the vertexes of the polygons and other attribute data. The host computer system manages graphic information for each polygon in its storage device, and in addition, stores all the texture data required for rasterization of a 3D object. The host computer system sequentially supplies the stored and managed graphic information to the graphics system 100 as data set units (or "drawing instructions sets"). A data set is a collection of data for defining a single polygon (or one part of a single polygon), and includes the coordinates for the vertexes of a polygon, a line width, a line type and an identifier (texture ID) for the texture to be mapped on the polygon. A screen region defined by a single data set essentially is constituted by only one type of texture.

The input terminal of the dispatch processor 10 is connected to a system bus in the host computer system, and its output terminal is connected to the succeeding geometry node processors 20 by a bus running between them. Upon receipt of the data set from the host computer system, the dispatch processor 10 distributes the geometric processing for the data sets to the succeeding geometry node processors 20 to equalize their work loads. In other words, the parallel geometric processing is performed as data set units.

Four of the geometry node processors 20, which perform the geometric processing for distributed data sets, are provided to perform parallel processing for the system 100 in this embodiment. Another specific function of the geometry node processor 20 in this embodiment is that it issues a texture command. More specifically, upon receipt of a data set from the dispatch processor 10, the geometry node processor 20 reads a texture ID from the received data set and transmits a texture command including the read texture ID, to the succeeding merge processor 30. Then, the geometry node processor 20 performs conventional geometric processing of the data set. Each of the geometry node processors 20 includes a First-in First-out (FIFO) buffer at its output terminal in which to store the geometrically processed data set.

The input terminal of the merge processor 30 is connected to the geometry node processors 20 by a bus running between them, and its output terminal is connected to the raster node processors 40 by a bus running between them. The merge processor 30 performs serialization for the data sets received from the geometry node processors 20, and distributes data as pixel units to the raster node processors 40 for rasterizing screen regions defined by individual data sets. The serialization is performed by extracting, in the order dispatched by the dispatch processor, the data sets temporarily stored in the FIFO buffers of the geometry node processors 20.

Other specific functions/structures of the merge processor 30 in this embodiment is that it includes a texture list 30-1, with which are managed the contents of the texture memory 45 that is the memory resource for the raster sub-system; and logic included in the block 30, for handling texture commands received from the geometry node processors 20. As is shown in FIG. 1, the texture list 30-1, which is placed in the incorporated memory of the merge processor 30. The texture list 30-1 specifies the relation between the texture IDs of texture data presently stored in the texture memory 45 and their current storage areas in the memory 45. According to the texture list 30-1, texture data for texture IDs of, for example, "Texture A", "Texture B", "Texture C" and "Texture D" are stored at start addresses 0x0000, 0x1200, 0x2000 and 0x4000 in the texture memory 45. The merge processor receives a texture command and examines its texture ID to determine whether or not it is present in the texture list 30-1. If the designated texture ID is not present, the merge processor issues an interrupt request to the resource management unit 35 for downloading the pertinent texture data.

The resource management unit 35 is connected to the system bus of the host computer system, and can exchange data or commands with the host computer system. When the resource management unit 35 has received an interrupt request from the merge processor, the resource management unit 35 downloads from the host computer system to the texture memory 45 texture data corresponding to the texture ID designated by the request. If the texture memory 45 has sufficient empty space, new texture data are written therein. If the texture memory 45 is filled with old data, unnecessary texture data are abandoned and new texture data are written therein. At this time, an LRU algorithm, etc., may be employed to determine which of the texture data in the texture memory 45 are unnecessary. In addition, after the resource management unit 35 has downloaded the texture data, it updates the texture list 30-1 in accordance with the new contents of the texture memory 45. It should especially be noted that the downloading of the texture data is performed regardless of the geometric processing, i.e., the downloading is performed without any interference by the geometry node processors 20.

The raster node processors 40 perform rasterization, i.e., interpolate drawing data for pixels in polygons defined by data sets. Since the parallel rasterization process is performed for minuite units, pixels, relatively many, 8 or 12, raster node processors are generally provided for the raster sub-system.

The texture memory 45, a primary memory resource of the raster sub-system, is employed to temporarily store texture data downloaded from the host computer system. The texture memory 45 has a memory capacity of several MBs, in which a large single texture, or several relatively small textures, can be stored. The texture memory 45 can be accessed by the raster sub-system. In other words, the raster node processors 40 can acquire color data of processed pixels by referring to the coordinate data included in the data set.

The results of the processing by the raster node processors 40 are merged by writing them in the frame buffers 50. The data are read from the frame buffers 50, as needed, and displayed on a display, similarly such as the one shown in FIG. 6, connected to the system 100 of FIG. 1. If the display is a CRT display, the digital data stored in the buffer 50 are converted into analog data before outputting to the CRT display.

B. System Operation

The hardware arrangement of the graphics system 100 according to the present invention has been explained. In this subdivision, the operation of the system 100 and the function of the present invention will be explained.

Operational characteristics of geometry node processors

Figure 2:
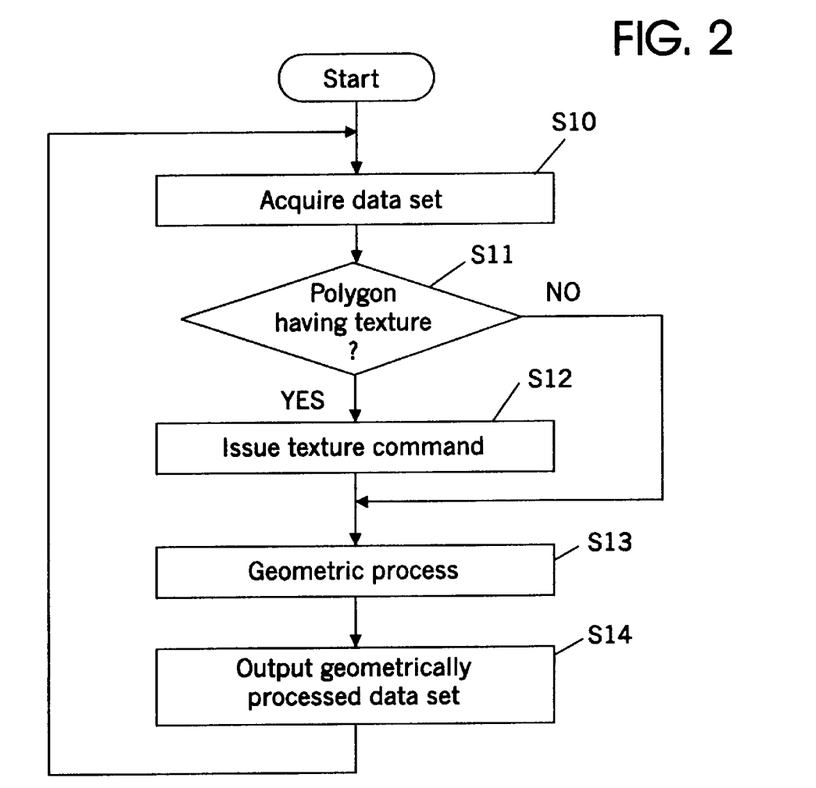
FIG. 2 is a flowchart showing the operational characteristics of geometry node processors 20.

As shown in FIGS. 1 and 2, when each of the geometry node processors 20 has received a data set from the dispatch processor 10 (step S10), it interprets the attribute data in the data set to determine whether or not texture is added to the data set (step S11). When the result is negative, texture mapping is not required for the received data set, i.e., a request for downloading of texture data is not necessary. The geometry node processor 20 skips step S12, and begins geometric processing of the received data set (step S13).

When the result at step S11 is affirmative, a texture command is issued (step S12). The texture command includes a texture ID that is read from the data set. The texture command is handled by the merge processor 30, which will be described later. It should be noted that the geometry node processors 20 do not participate in the management of texture data, i.e., during the geometric processing, there is no wait time for downloading the texture data.

Following this, the geometry node processor 20 performs the geometric processing of the data set (step S13), and outputs the results to the merge processor 30 (step S14). Program control then returns to step S10 to repeat the above described processes.

Operational characteristics of merge processor

Figure 3:
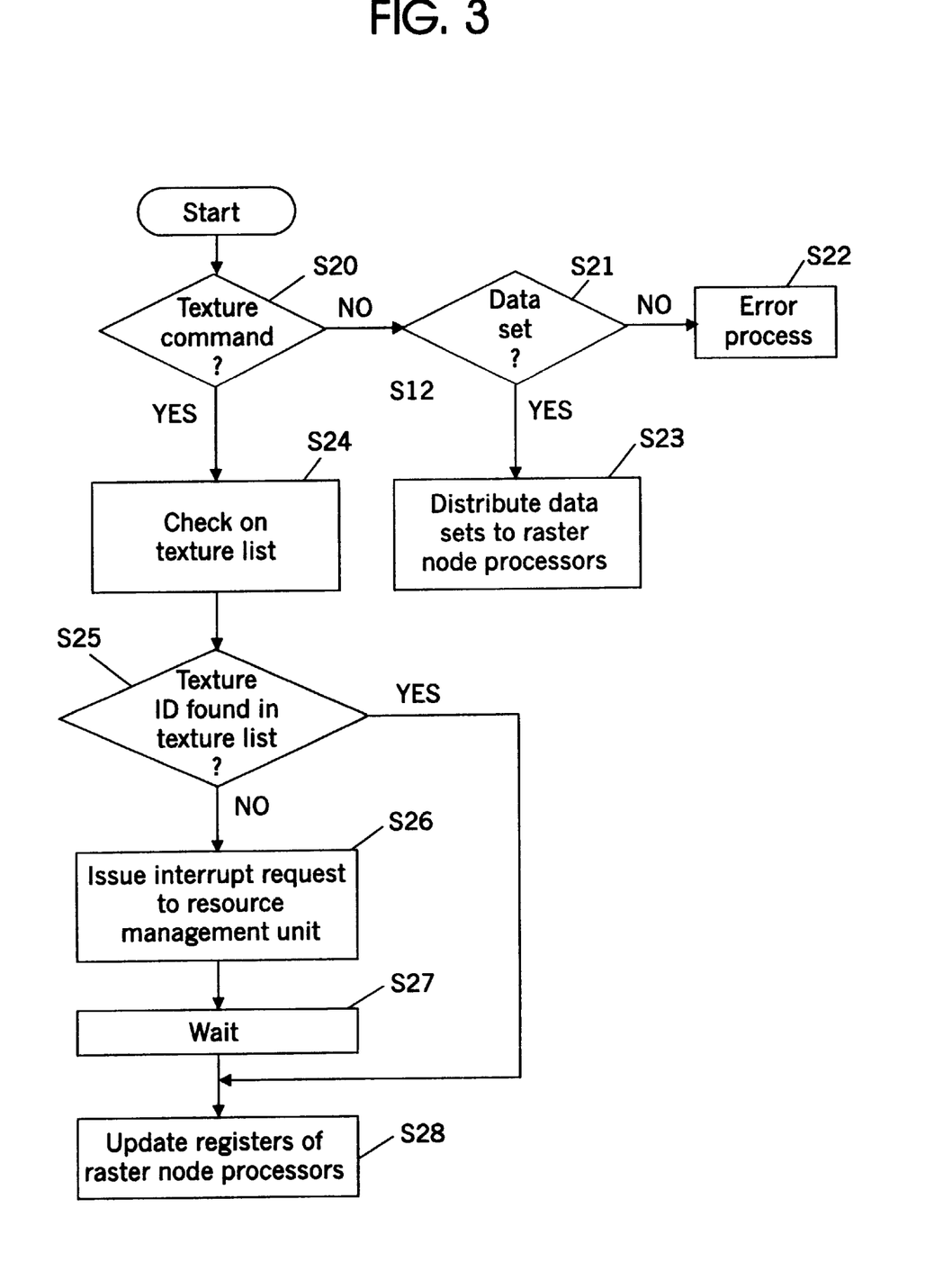
FIG. 3 is a flowchart showing the operational characteristics of merge processor 30.

Referring now to FIGS. 1 and 3, the merge processor 30 reads data or a command from the FIFO buffer of one of the geometry node processors 20, in accordance with the order in which the data or commands have been issued. The merge processor 30 then determines whether or not a texture command has been read (step S20).

When the result at step S20 is negative, the merge processor 30 then determines whether or not the read data is a data set (step S21). If the read data is a data set, that data set is distributed to one of the raster node processors 40 for rasterization (step S23). When the read data is not a data set, it means that an error in the processing has occurred, and program control jumps to an error routine (step S22).

If the result at step S20 is affirmative, i.e., if the read data constitute a texture command, the merge processor 30 determines whether or not a texture ID designated by the texture command is in the texture list (step S24). If the texture ID is in the texture list, program control advances and branches to "YES" at step S25 and steps S26 and S27 are skipped. At step S28, the size of the texture data for the next data set, and a corresponding storage area in the texture memory 45 are written in a control register in the raster node processor 40. Processing is thereafter terminated.

When a texture ID designated by the texture command is not found in the texture list, i.e., when desired texture data is not present in the texture memory 45, program control advances and branches to "NO" at step S25. Then, an interrupt request for downloading the texture data is issued to the resource management unit 35 (step S26). The interrupt request includes a texture ID.

While the resource management unit 35 is downloading texture data or performing an associated process, the merge processor 30 is in the wait state (step S27). While in the wait state, the merge processor 30 does not read data or commands from the FIFOs of the geometry node processors 20, and does not distribute data to the raster node processors 40 for rasterization.

In response to a resume request from the resource management unit 35, which will be described later, the merge processor 30 recovers from the wait mode to the normal mode. At step S28, the size of texture data for the next data set, and a corresponding storage area in the texture memory 45 are written in the control register of each of the raster node processors 40. The processing is thereafter terminated.

Operational characteristics of resource management unit

Figure 4:
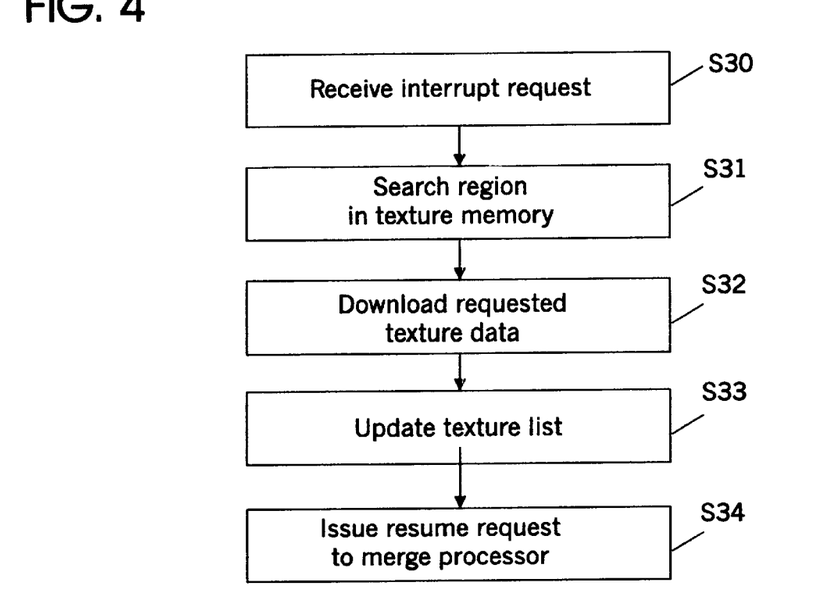
FIG. 4 is a flowchart showing the operational characteristics of a resource management unit 35.

Referring to FIGS. 1 and 4, the resource management unit 35 receives an interrupt request from the merge processor 30 and begins its operation (step S30).

The resource management unit 35 searches the texture memory 45 for an appropriate area in which to store texture data requested for downloading (step S31). If an appropriate empty area is found in the texture memory 45, it is determined to be a downloading area. If there is no empty area, unnecessary texture data that have been stored in the texture memory 45 are abandoned, and the emptied area is employed as a downloading area. At this time, an LRU algorithm, for example, may be employed to determine whether or not specific texture data is unnecessary.

In accordance with the interrupt request, the resource management unit 35 downloads texture data from the storage area in the host computer system to the texture memory 45 (step S32).

Sequentially, the resource management unit 35 updates the texture list 30-1 in the merge processor 30 in accordance with the results of the downloading (step S33). When, for example, Texture B at address 0x1200 and Texture C at address 0x2000 in the texture memory 45 are abandoned, and Texture E has been newly downloaded, the texture list 30-2 is rewritten as is shown in Table 1.

TABLE 1

| Texture list | |
|---|---|
| Texture A | 0 x 0 0 0 0 |
| Texture E | 0 x 1 2 0 0 |
| Texture D | 0 x 4 0 0 0 |

As is described above, when the resource management unit 35 has completed the downloading and the associated process, it issues a resume request to the merge processor 30 (step S34). In response to this, the merge processor 30 recovers to the normal mode, as was previously described, and resumes the operation.

Operational characteristics of raster node processors

Figure 5:
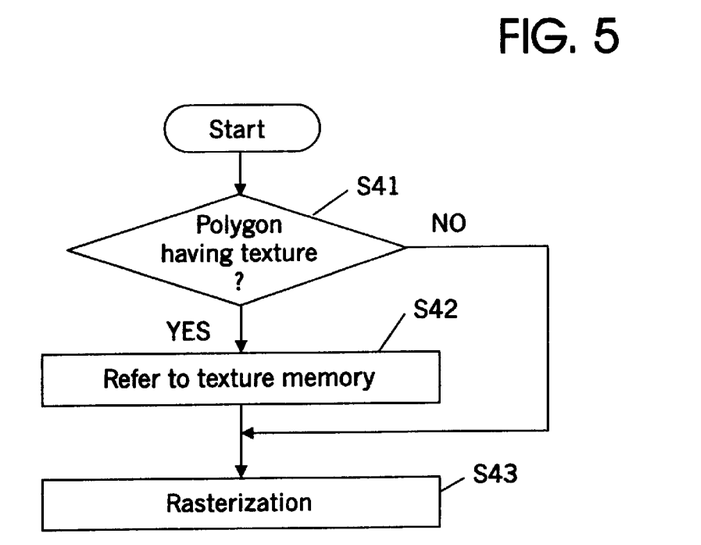
FIG. 5 is a flowchart showing the operational characteristics of raster node processors 40.

Referring now to FIGS. 1 and 5, once one of the raster node processors 40 is assigned to perform the rasterization of one pixel in a screen region defined by a data set, the raster node processor 40 first determines whether or not the data set is for a polygon having a texture (step S41).

When the data set concerns a polygon having a texture, according to the contents in its own control register, the raster node processor 40 refers to the texture memory 45 (step S42), and rasterizes the pixel (step S43). If the data set concerns a polygon having no texture, the raster node processor 40 skips step S42 and rasterizes the data (step S43).

As is described above in detail, according to the present invention, a graphics system is provided in which geometric sub-system can process without taking the memory resource of a raster sub-system into consideration. The present invention does not cause impairment of parallel geometric processing. In addition, according to the present invention, a graphics system, which has a parallel processing geometric sub-system, that can efficiently manage a memory resource for a raster sub-system.

While the present invention has been described in detail while referring to one specific embodiment, it should be obvious to one having ordinary skill in the art that various modifications or revisions of the embodiment are possible within the scope of the present invention. That is, although the present invention has been disclosed by using one embodiment, it should be understood that it is not limited to that embodiment but that various changes can be made therein without departing from the spirit and scope of the invention.

What is claimed is:

1. A graphics system, which sequentially receives from a host computer system data sets that define a graphic object, and which downloads texture data from said host computer system so that geometric processing and rasterization are performed on said graphic object for display on a computer screen, comprising:

(a) a dispatch processor, for receiving data sets from said host computer system and for distributing data sets for geometric processing;

(b) a plurality of geometry node processors, each of said geometry node processors issuing distributing data sets with a texture command including a texture identifier identifying a texture data group and performing geometric processing of said distributed data sets;

(c) a merge processor, for merging geometrically processed data sets output by said geometry node processors and for distributing said data sets for rasterization;

(d) a texture memory, in which one or more texture data groups, including some but not all of said texture data of said host computer system are stored;

(e) a raster processor, for receiving said geometrically processed data sets from said merge processor for rasterizing said geometrically processed data sets and for adding texture to pixels of said data sets obtaining texture data from said texture memory; and (f) texture memory management means for managing texture data stored in said texture memory placing texture data groups in said texture memory in accordance with said texture commands of each of said geometry node processors so that required texture data is resident in the texture data memory when requested by the raster processor.

2. The graphics system according to claim 1, wherein said texture memory management means includes:

(f-1) a texture list in said merge processor of texture identifiers of said texture data, which specifies a relationship between texture data groups currently stored in said texture memory and corresponding storage areas in said texture memory;

(f-2) first control means in said merge processor for determining whether or not said texture identifier indicated by a received texture command is included on said texture list and for issuing an interrupt request if said texture identifier isn't included on said texture list interrupting the transfer of data sets to the raster processor; and (f-3) second control means for responding to said interrupt request by downloading to said texture memory a texture data group corresponding to said texture identifier from said host computer system, and for updating a result obtained by said downloading in said texture list and upon updating the texture list issuing a resume request to the merge processor.

3. The graphics system according to claim 1, wherein said merge processor includes means for maintaining the order of data sets.

4. The graphics system according to claim 1, wherein said raster processor includes a plurality of raster node processors, each of said raster node processors texturizing and rasterizing pixels in screen regions defined by said data sets.

5. The graphics system according to claim 4 wherein the second control means includes means for replacing texture data resident in the texture memory with said downloaded texture data when the texture memory is full.

6. The graphics system according to claim 5 wherein said second control means replaces texture data in accordance with the least recently used (LRU) algorithm.

7. In a graphics system, which sequentially receives from a host computer system data sets that define a graphic object, and which downloads texture data from said host computer system so that geometric processing and rasterization are performed on said graphic object for display on a computer screen, the method comprising:

(a) receiving data sets from said host computer system and distributing such data sets to a plurality of geometry node processors for geometric processing;

(b) issuing a texture command from each of the geometry node processors including a texture identifier specified in distributed data sets and performing geometric processing of said distributed data sets;

(c) merging geometrically processed data sets outputted by said geometry node processors in a merge processor and distributing said data sets for rasterization;

(d) storing the downloaded texture data in a texture memory;

(e) receiving said geometrically processed data sets from said merge processor and rasterizing said geometrically processed data sets in a plurality of raster processors which each obtain texture data from the texture memory and then add that texture data to the pixels of the data sets; and (f) managing texture data to be stored in said texture memory in accordance with said texture commands received from each of said geometry node processors having the merge processor assure texture data required for data sets is in the texture data memory prior to providing those data sets to the raster processors.

8. The method according to claim 7, including:

(f-1) maintaining a texture list of texture identifiers of said texture data in the merge processor, which list specifies the relation between currently stored in said texture memory and corresponding storage areas in said texture memory;

(f-2) determining in the merge processor whether or not said texture identifier indicated by a received texture command is included on said texture list and issuing an interrupt request if said texture identifier isn't included on said texture list; and (f-3) in response to said interrupt request, downloading texture data corresponding to said texture identifier from said host computer system to said texture memory, and updating a result obtained by said downloading in said texture list.

9. The method according to claim 8, including maintaining the order of data sets.

* * * * *